US006591382B1

(12) United States Patent
Molloy et al.

(10) Patent No.: US 6,591,382 B1
(45) Date of Patent: Jul. 8, 2003

(54) PERFORMANCE IMPROVEMENT OF INTERNET PROTOCOLS OVER WIRELESS CONNECTIONS

(75) Inventors: Walter Molloy, San Diego, CA (US); Thomas P. Trotta, Encinitas, CA (US); Donald B. Eidson, San Diego, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 0 days.

(21) Appl. No.: 09/375,607

(22) Filed: Aug. 17, 1999

(51) Int. Cl.$^7$ ................................................. G06F 11/00
(52) U.S. Cl. ...................................................... 714/704
(58) Field of Search .............................. 714/704, 708, 714/774; 370/342, 468; 358/412

(56) References Cited

U.S. PATENT DOCUMENTS

| | | | | |
|---|---|---|---|---|
| 5,905,741 A | * | 5/1999 | Matsukuma et al. | 714/758 |
| 6,038,452 A | * | 3/2000 | Strawczynski et al. | 455/403 |
| 6,069,924 A | * | 5/2000 | Sudo et al. | 375/330 |
| 6,167,039 A | * | 12/2000 | Karlsson et al. | 370/320 |
| 6,272,190 B1 | * | 8/2001 | Campana, Jr. | 375/347 |
| 6,314,535 B1 | * | 11/2001 | Morris et al. | 370/468 |
| 6,347,081 B1 | * | 2/2002 | Bruhn | 370/337 |

OTHER PUBLICATIONS

Badrinath et al., "Handling mobile clients: A case for indirect interaction," *Proceedings of the 4$^{th}$ Workshop on Workstation Operating Systems* pp. 91–97, Napa CA, Oct. 1993.
Balakrishnan et al., "Improving reliable transport and hand-off performance in cellular wireless networks," *Wireless Networks* 1(4):469–481 (1995).
Caceres et al., "Improving the performance of reliable transport protocols in mobile computing environments," *IEEE Journal on Selected Areas in Communication* 13(5):850–857(1995).
Karn, "The Qualcomm CDMA Digital Cellular System," *Proceedings of the USENIX Molile & Location–Independent Computing Symposium*, pp. 35–39, Cambridge MA, Aug. 1993.
Saltzer et al., "End–to–end arguments in system design," *ACM Transactions on Computer System* 2(4):277–288 (1984).
Tanenbaum, "The OSI reference model," *Computer Networks* 3$^{rd}$ Ed. p. 29.

* cited by examiner

*Primary Examiner*—Albert Decady
*Assistant Examiner*—Esaw Abraham
(74) *Attorney, Agent, or Firm*—Farjami & Farjami LLP

(57) ABSTRACT

A system and method for providing improved performance using TCP/IP protocols over wireless networks that can be implemented entirely within the link layer of a protocol stack. The system and method responds to low signal levels caused by weak and fading wireless connections by maintaining throughput and circumventing inappropriate instances of TCP/IP congestion avoidance mode. At least two selectable service protocols, comprising at least one selectable basic error-detecting/correcting protocol and at least one selectable robust error-detecting/correcting protocol, are implemented within link layers of both the mobile station and the base station. A quality of service monitor installed within the link layer monitors signal quality. When the quality of service monitor detects a signal quality that falls below a predetermined threshold or predicts a future signal degradation, the mobile station switches to the robust error-detecting/correcting service protocol and informs the base station of the changeover. The base station similarly switches to the robust error-detecting/correcting service protocol, beginning at a predetermined data frame. If the quality of service rises above a second predetermined threshold, the basic error-detecting/correcting protocols are restored both within the mobile and base stations.

70 Claims, 12 Drawing Sheets

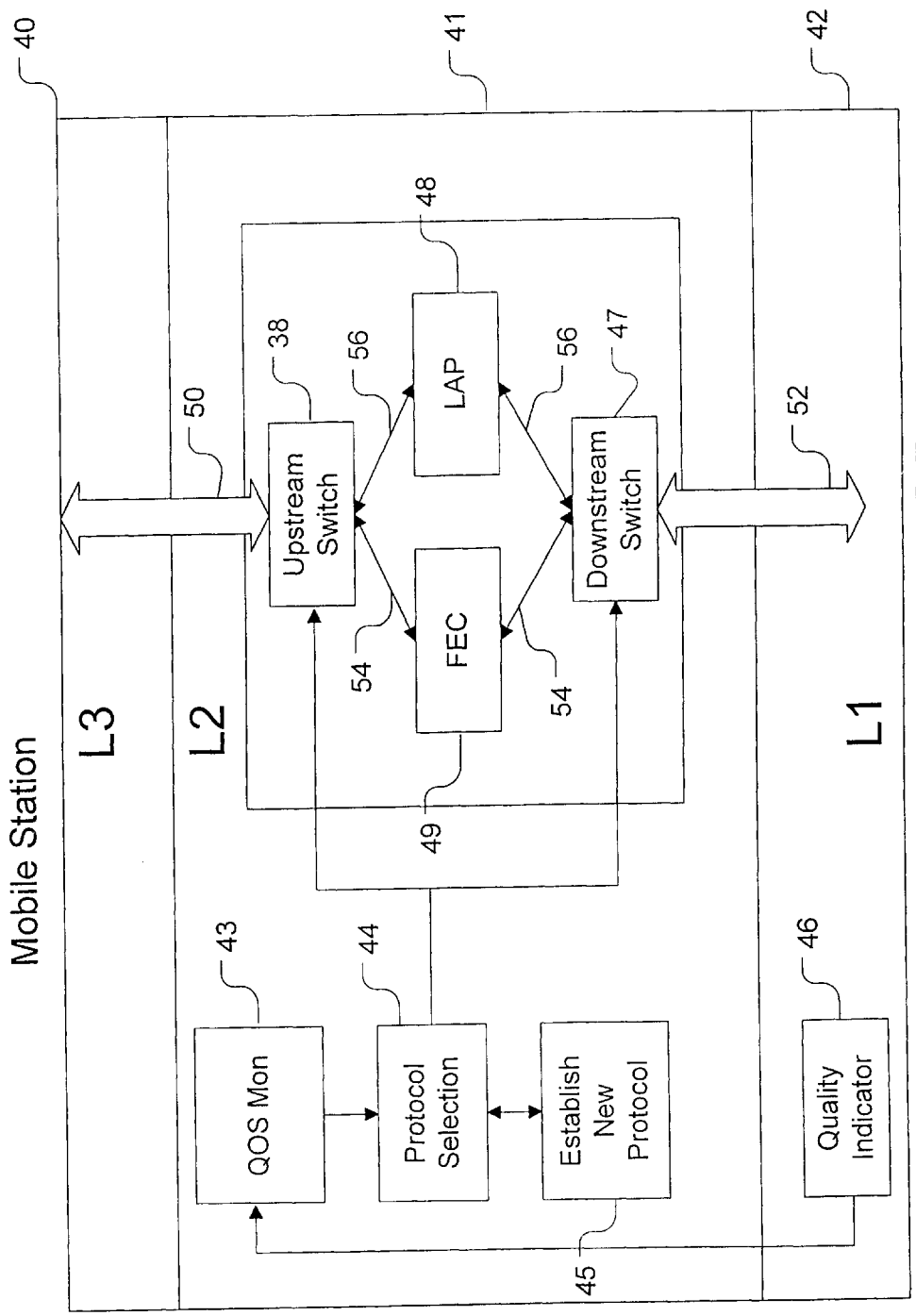

Determine Support for
Switchable L2 During
XID Negotiation

```
/* Table Preparation and Table Handling instructions
*/

Store vector of Signal Quality which would at a particular
dues in SQ_table (this would be the y-data on y vs x plot)

IF (vector of CNR values corresponding to Signal
Quality values is to be       uniformly spaced)

{ store min_CNR_in_table, CNR_table_increment, and
max_CNR_in_table

}

ELSE (vector of CNR values corresponding to Signal
Quality values is not to      be uniformly spaced

{ store vector of CNR values corresponding to Signal
Quality values as       CNR_table store length_of_CNR_table (during   computations   one    will    access
min_CNR_in_table and                    max_CNR_in_table
via the appropriate addressing indices, which are,
    1 or, length_of_CNR_table, respectively, of CNR_table)

} END IF
```

Fig. 8A

```
/* Initialization */

Select   Allowable   Interference   Margin   in   dB,
Intf_Margin

/* Set the Interference Level to Zero */

Intf_level_est  ←   0;
```

Fig. 8B

```
                    /* General Operation */

FOR each frame:

{

Get instantaneous RSSI measurement for Frame (max
of early/middle/late),    RSSI Get instantaneous Signal Quality measurement for
frame, SQ Look up CNR_basedon_SQ corresponding to this SQ
from table. i.e.find   value in SQ_table closest to SQ,
and determine the CNR associated with    this SQ table
value. Call this value CNR_basedon_SQ. If SQ does not lie
   within bounds of  SQ_table, use association based on
closest value which   is in the table.

/* account for cases where RSSI does not lie
within tabulated bounds */

IF (RSSI >= max_CNR_in_table)

RSSI ← max_CNR_in_table

ENDIF

IF (RSSI <= min_CNR_in_table)

RSSI ← min_CNR_in_table

ENDIF
```

Fig. 8C

Continued from FIG. 8C

/* Filter difference between measured RSSI and RSSI perceived by SQ measurement

Intf_level_est ← (1-α) Intf_level_est + α (RSSI - CNR_basedonSQ)

/* α is a TBD parameter which is (1/2) to some integer power. 1/16 or 1/32 tend to work well in simulations */

/* $X_{TBD}$ is a value TBD which relates to the variability in RSSI measurements and choice of small α---which limits the amount of averaging done. A small α, however, is necessary for quick transient responses. $X_{TBD}$ should be small. */

IF (Intf_level_est > Intf_margin + $X_{TBD}$)

Send 'Interference Detected from SQ' message to RME, along with value of Intf_level_est

ENDIF

END For each Frame 'FOR LOOP'

Fig. 8D

PERFORMANCE IMPROVEMENT OF INTERNET PROTOCOLS OVER WIRELESS CONNECTIONS

BACKGROUND OF THE INVENTION

1. Field of the Invention

The present invention relates generally to a system and method for providing improved performance of Internet protocols over wireless connections, and more specifically, to a system and method for improving performance of Internet protocols by preventing TCP/IP congestion avoidance mode as a result of errors in the wireless connection.

2. Related Art

Current trends indicate a significant increase in the use of mobile computing devices such as auto PCs, personal digital assistants (PDAs) and the like. Accordingly, there is an increasing demand for fast and reliable wireless communication links to computer networks, such as the Internet.

The problem is that current communication techniques using TCP/IP protocol suites have proven to be troublesome when used in wireless networks. This is primarily due to the fact that TCP/IP was originally designed to be used with hard-wired or "fixed" transmission links rather than wireless radio links.

Specifically, the TCP/IP suite of protocols was designed for environments using highly reliable transmission media with very low bit error rates (BER). Thus, TCP/IP was designed with the assumption that the underlying physical connections used to transport the data were error-free. Consequently, TCP/IP assumes that low bandwidth conditions are caused by congestion, rather than problems related to the underlying transport media. Accordingly, TCP/IP responds to low bandwidth conditions (i.e. packet losses) by slowing down the transmission rate. This works well for wired networks but can be disastrous for wireless connections.

Typically, packet losses in wireless networks are not caused by congestion but are caused by high bit error rates due to weak and fading wireless transmission links. The quality of such wireless transmission links is affected by physical obstructions, weather conditions, atmospheric conditions, power failures, and the distance between cells (and density of cells) in a cellular network. In most cases, congestion avoidance (by stopping transmission for a period of time) during adverse conditions is an inappropriate response in a wireless network. Moreover, the resultant reduction in overall transmission rates during rapidly fading conditions only serves to further increase already existing bandwidth problems.

One of the built in error-correcting procedures used by TCP/IP is referred to as congestion avoidance mode. When packet losses are detected, TCP/IP enters into congestion avoidance mode, which causes an exponential reduction in the transmission rate. This procedure works well for fixed networks because the packet loss is almost always due to traffic congestion.

However, in a wireless network, where the packet loss is often due to rapidly fading conditions, a reduction in the transmission rate should be avoided at all costs. Entering into congestion avoidance mode only serves to increase problems and cause additional and unnecessary delays. Instead, during these conditions, throughput should be maintained and other forms of error correction techniques should be used.

Solutions to this problem have been proposed as is evidenced by the following publications: (1) R. Cáceres et al. "Improving the Performance of Reliable Transport Protocols in Mobile Computing Environments," IEEE Journal on Selected Areas in Communications, Vol. 13, No. 5, June 1995; (2) P. Karn, "The Qualcomm CDMA digital Cellular System," Proceedings of the USENIX Molile & Location-Independent Computing Symposium, pp. 35–39, August 1993; (3) Hbalakrishnan et. al "Improving Reliable Transport and Handoff Performance in Cellular Wireless Networks," Wireless Networks, Vol. 1, No. 4, pp 469–481, 1995; (4) J Saltzer et al. "End-to-end Arguments in System Design," ACM Transactions on Computer System Design," ACM Transactions on Computer System (TOCS), Vol. 2, No. 4, pp. 277–288, 1984; and (5) B. R. Bandrinath et. al "Handling Mobile Clients: A Case for Indirect Interaction," Proceddings of the 4th Workshop on Workstation Operating Systems, pp. 91–97, October 1993.

However, these conventional solutions require changes to the link layer to provide error free service to the transport layer. Further, current link layer error detection and correction schemes introduce additional delays due to the retransmission of data. Thus, using techniques, such as the sliding window protocols as suggested by (1) above, can still trigger congestion avoidance mode in TCP/IP.

Another approach is to offer limited link layer recovery, leaving complete recovery to the transport layer, as suggested by (2) above. The problem with this solution is that it doesn't address TCP/IP congestion avoidance issue at all, it just delays its onset.

Yet another conventional approach, as suggested by (3) above, is to add a snoop agent to base station routing software. Using this approach, the snoop agent maintains a cache of unacknowledged base station-to-mobile station TCP packets. When a packet loss is detected (e.g. via duplicate acknowledgements or a local timeout), the snoop agent retransmits the lost packet, preventing congestion recovery by TCP. An acknowledgement from the mobile station allows the snoop agent to clean up its cache, update round trip time estimates, etc.

The problem is that these conventional approaches all require significant overhead in terms of software and design changes to current systems. For example, the snoop agent approach requires that IP multicast be implemented and used during cellular handoffs. Further, this solution requires that TCP be modified on the mobile station side. Still further, this and other conventional approaches violate protocol-layering principles by using information and messages in the transport layer for link layer purposes.

Accordingly, what is needed is a system and method for providing improved transmission rates using TCP/IP protocols over wireless networks that can be implemented without changing TCP/IP protocols and circumvents inappropriate occurrences of TCP congestion avoidance mode.

SUMMARY OF THE INVENTION

Accordingly, the present invention is directed toward a system and method for providing improved performance of Internet protocols over wireless networks. An advantage of the present invention is that it can be implemented entirely within the link layer of a protocol stack and does not affect any of the other layers. Another advantage of the present invention is that it responds appropriately to low-bandwidth conditions caused by weak and fading wireless connections by maintaining throughput and thereby circumvents inappropriate instances of TCP/IP congestion avoidance mode.

The present invention comprises at least one basic error-correcting/detecting service protocol and at least one robust error-detecting/correcting service protocol within the link layers of the mobile and base station's protocol stacks. Communications are initiated using a well known basic error-detecting/correcting protocol, such as Link Access Protocol (LAP). During data communications, a quality of service monitor constantly monitors the signal quality, via a signal quality indicator, generally coupled to the physical layer. An example of a signal quality indicator is a data logger that maintains a log of bit error rates during data communications. Another example of a quality indicator is a channel quality estimator that can be used to predict a degradation of signal quality.

When the quality of service monitor detects that the signal quality falls (or is about to fall), below a predetermined threshold, the mobile station attempts to switch to the robust error-detecting/correcting service protocol to be used during weak conditions. An example of an robust error-detecting/correcting protocol is forward error correction (FEC) protocol.

To accomplish the changeover, the mobile station first determines whether the base station supports the switchable protocol feature of the present invention. If the feature is not supported, then the changeover is temporarily disabled. In this fashion, the present invention is transparent and fully compatible with conventional systems. Generally, the determination of whether the base station supports the changeover feature of the present invention is accomplished during the link establishment phase.

If the changeover feature of the present invention is supported, a switchover message is sent from the mobile station to the base station directing it to switch to the robust error-detecting/correcting protocol on the next frame (or a specified frame number). The mobile station and the base station switch to the robust error-detecting/correcting protocol, which is used during weak signal conditions. If the quality of service rises above a second predetermined threshold, the basic error-detecting/correcting protocol is restored in both the mobile and the base stations.

BRIEF DESCRIPTION OF THE FIGURES

The present invention is described with reference to the accompanying drawings, wherein:

FIG. 3A is a block diagram depicting components of the present invention within a mobile station, according to an embodiment of the present invention.

FIGS. 8A–8D are example algorithms written is pseudocode that can be used for Signal Quality Statistic-based Interference Tracking in accordance with an embodiment of the present invention.

In the figures, like reference numbers generally indicate identical, functionally similar, and/or structurally similar elements.

DETAILED DESCRIPTION OF THE PREFERRED EMBODIMENTS

The present invention is directed toward a system and method for providing improved performance using TCP/IP protocols over wireless networks that can be implemented entirely within the link layer of a protocol stack. The system and method of the present invention responds to poor quality channel conditions caused by weak and fading wireless connections by maintaining transmission throughput and preventing TCP/IP congestion avoidance mode.

Figure 1:
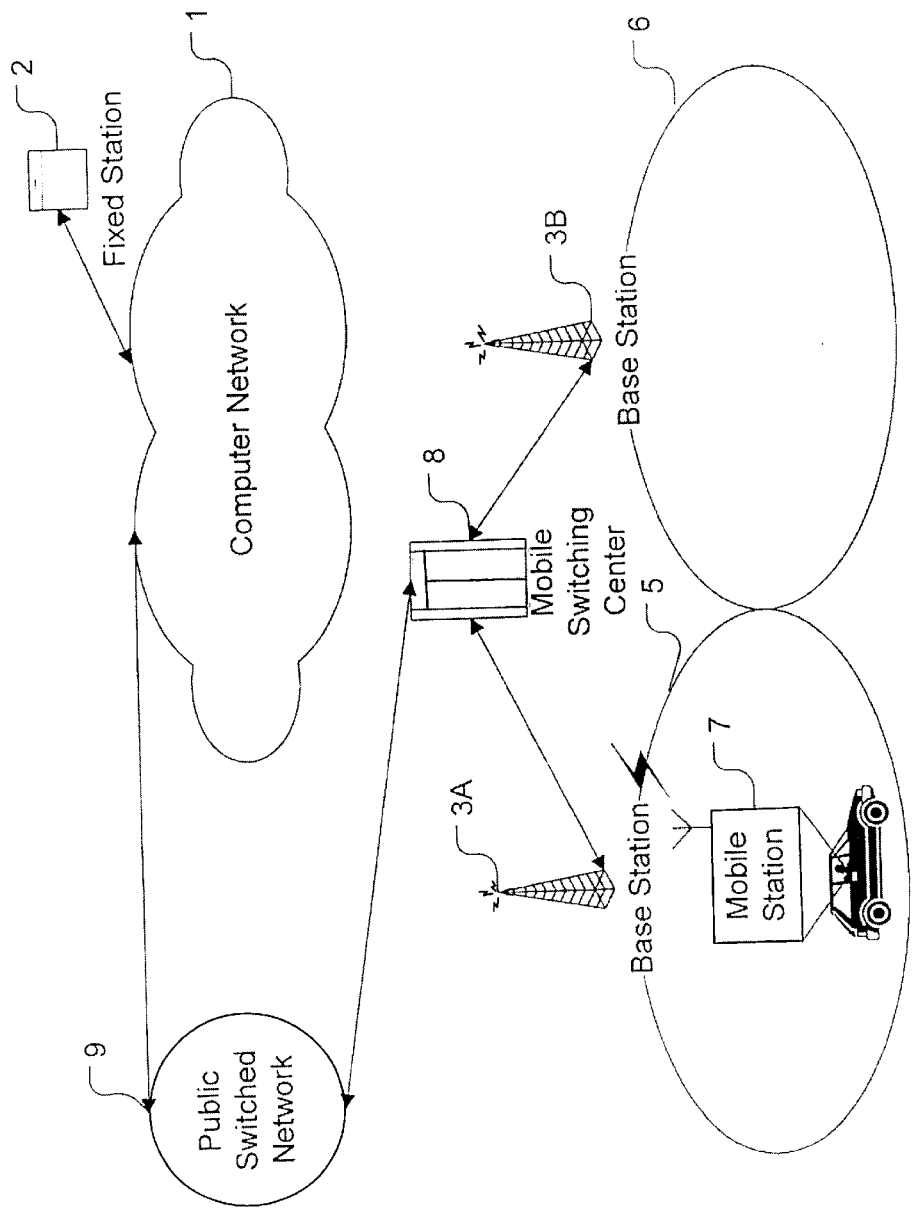
FIG. 1 is a diagram depicting a typical operation environment, according to an embodiment of the present invention.

FIG. 1 is a diagram depicting a typical operating environment according to a preferred embodiment of the present invention. A mobile station 7 is typically installed within a mobile unit such as an automobile or the like. In one embodiment, the mobile station 7 is a general-purpose computer system running an application program, such as a World Wide Web browser. In other embodiments the mobile station 7 is a PDA, an Auto PC, a pager, a cellular telephone, a navigational computing system, or the like.

As shown in FIG. 1, the mobile station 7 is performing end-to-end communications with the fixed station 2. The fixed station 2 is coupled to a computer network 1, such as the Internet. As shown, part of the communication path between the fixed station 2 and the mobile station 7 is maintained through a wireless communication link.

It should be noted that the Internet is just one example of a computer network that can be used with an embodiment of the present invention. In other embodiments, any type of computer network can be used. Accordingly, the use of the Internet in the examples presented herein, should not be construed to limit the scope and breadth of the present invention In the examples presented below, cellular technology is used to implement the wireless communication links of the present invention. For example, in FIG. 1, the base stations 3A and 3B (generally, 3) and the mobile switching center 8 represent a portion of a typical cellular network. The base stations 3 send and receive radio signals to and from the mobile station 7. The mobile switching center 8 is coupled to the base stations 3 via standard telecommunication transmission lines. Likewise, the mobile switching center 8 is typically coupled to a public switched telephone network 9 via standard telecommunication transmission lines. Typically, a public switched network 9 is coupled to the Internet 1 at point-of-presence using high bandwidth telecommunication channels.

The cells 5 and 6 represent the range of the transceivers in each of the base stations 3A and 3B, respectively. As the mobile station 7 moves within cell 5, or between the cells 5 and 6, it transmits and receives data packets with the particular base station 3 associated with the current cell. Generally, the cells 5 and 6 overlap one another so that the mobile station 7 is always in radio communications with at least one base stations 3. Switching from one base station, such as 3A to another base station, such as 3B, is referred to herein as handover.

Note that the cellular network shown in FIG. 1 is just one example of a technology that can be used to implement the wireless communications of the present invention. In other embodiments, different types of wireless technology can be used, such as low orbit or geosynchronous orbit satellite communications. In fact, any type of wireless technology can be used to provide the wireless communication links in accordance with the present invention.

Figure 2:
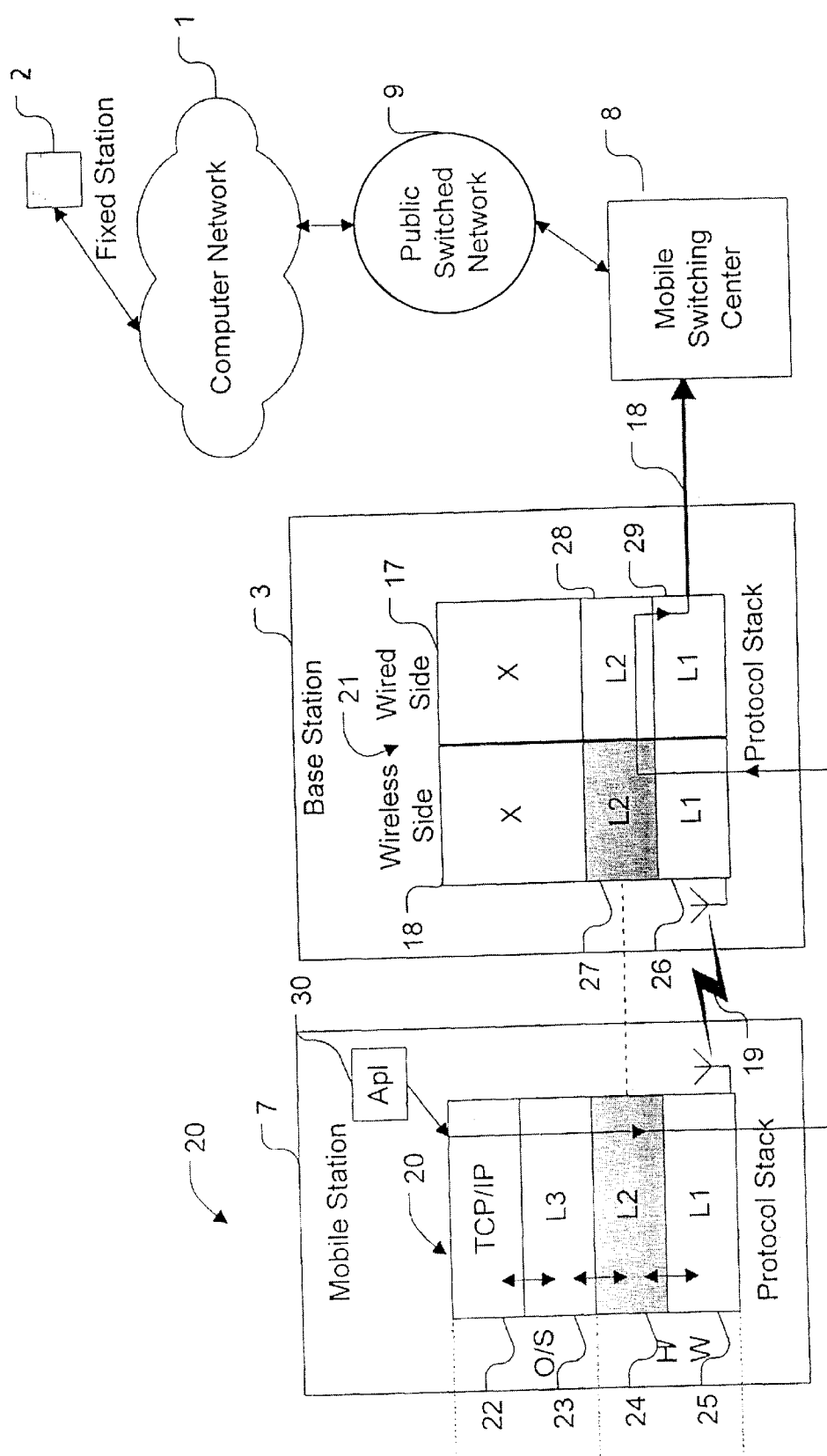
FIG. 2 is a block diagram depicting portions of protocol stacks within a mobile station and a base station, according to an embodiment of the present invention.

FIG. 2 is a block diagram depicting details of the mobile station 7 and the base station 3 in accordance with one embodiment of the present invention. In particular, FIG. 2 depicts a portion of the protocol stacks 20 and 21 that are implemented via software and/or hardware within the mobile station 7 and the base station 3, respectively. The communications path indicator 24 depicts the logical communication flow through the various protocol layers within the protocol stacks 20 and 21.

As shown, the mobile station 7 comprises a protocol stack 20. The protocol stack 20 as depicted, is based on the Open System Interconnection (OSI) reference model. In this example, only those portions of the OSI reference model relevant to the present invention are shown. Accordingly, the protocol stack 20, in this example, comprises a physical layer (layer-1) 25, a data link layer or "link layer" (layer-2) 24, a network layer (layer-3) 23 and a transport layer 22. An application layer is depicted as the application module 30.

It should be noted that the layered models presented in the examples herein are simplified versions of actual layered protocol stacks. These simplifications are used for the sake of clarity and to distinctly point out the details of the present invention. For example, layers that are not relevant to the description of the present invention are not depicted. In addition, TCP/IP is depicted and described as a single layer, rather than four separate layers (i.e. L4 {Telnet or FTP or e-mail etc.}; L3 {TCP or UDP}; L2 {IP or ICMP or IGMP}; L1 {interface to whatever is underneath}.).

It is noted that TCP/IP is a protocol suite and is generally considered to be a 4-layer system consisting of a number of protocols at each of the four layers. It is, however, common practice to refer to the TCP/IP protocol suite as if it was a single layer.

This simplification is made to emphasize the point that changes to the TCP/IP are not required in accordance with a preferred embodiment of the present invention.

Referring now to FIG. 2, the shaded portions of the protocol stacks 20 and 21 are the only portions that are modified in accordance with a preferred embodiment of the present invention. In particular, the present invention is implemented by modifying only the link layer 24 of the mobile station's protocol stack 20 and the link layer 27 in the wireless side 18 of the base station's protocol stack 21.

Thus, unlike conventional solutions, which require extensive modifications, an advantage of the present invention is that TCP/IP is not modified to implement the performance improvement over wireless networks.

As described below, an embodiment of the present invention is implemented at the link layer. In general, the link layer takes data from the higher layers, creates data packets, and sends the packets out through the physical layer. In the opposite direction, the link layer receives packets from the physical layer, then combines the packets and sends data to the higher layers.

Thus, by only modifying the link layer 24, the present invention is transparent to higher layers (23, 22, and 27) and to the physical layer 25 and 26. In this fashion, application programs, such as the application program 30 and the operating system are not altered. Instead, as described below, the present invention is implemented entirely via firmware changes within network devices such as modems, cellular network communication devices and the like.

Each layer in the protocol stacks 20 and 21 offer a service to the layer above. These services are depicted in FIG. 2 as the double-sided arrows between the layers. For reasons of speed and efficiency, the physical layer 25 is typically implemented in hardware. .The link layer 24, network layer 23 and the TCP/IP protocol suite 22 are generally implemented in software. Typical services offered to the link layer 24 by the physical layer 25 are channel detection/selection; frame extraction and delivery to the link layer 24. The link layer 24 will perform an error detection and correction service, a re-assembly service and a delivery service to the network layer 23. The network layer 23 may offer an encryption/decryption service and a header compression/decompression service to the IP layer within the TCP/IP protocol suite 22. The TCP/IP protocol suite 22 offers a reliable data transport service to the application program 30. Examples of such protocol stacks are IS-707 CDMA Data Services; Cellular Digital Packet Data (CDPD); GSM Packet Radio Service (GPRS), and pACT.

The application module 30 represents an application program, such as a web browser or the like. Such application programs 30 generally run on top of the protocol stack. Examples of web browser application programs include Internet Explorer® and Netscape Navigator®.

The path indicator 24 depicts the physical communication path from the mobile station 7 to the base station 3 through the various protocol layers. As shown, the application program 30 communicates with the TCP/IP suite 22. Next, as indicated, the TCP/IP suite 22 communicates with the network layer 23, which is generally part of the protocol stack. The network layer 23, communicates with the link layer 24, which as stated, are generally implemented in software. The link layer 24 communicates with the physical layer 25, which as stated, is generally implemented in hardware.

Generally, data from the physical layer 25 is transmitted over a transmission link to a receiving device. The receiving device, having a similar protocol stack as the sending device, receives the data through the receiving device's physical layer. The path 24 in this example shows the conceptual data path from the physical layer 25 in the mobile station 7 to the physical layer 26 in the base station 3. The physical data path is depicted by the wireless radio communication link 19.

The base station 3 comprises a protocol stack 21. In this example, the base station 3 serves as a communication gateway between two end-to-end peers, namely the mobile station 7 and the fixed station 2. Accordingly, only two layers, the physical and link layers, are required for the gateway device 3.

In addition, the protocol stack 21 comprises a wireless side 18 and a wired side 17. The wireless side 18 communicates with the mobile station 7, via a wireless communications link 19. The wired side 17 communicates with the mobile switching center 8, via a hard-wired communications link 18.

As indicated, data enters the physical layer 26 and is passed to the link layer 27 on the wireless side 18. The shaded block of link layer 27 indicates that changes to this layer are required for a typical implementation of the present invention. Next, as indicated, the data is sent to the link layer 28 on the wired side of the protocol stack 21. Next, the data is passed to the physical layer 29, where it is transmitted over the wired telecommunications link 18 to the mobile switching center 8.

As stated, the highlighted blocks 24 and 27 indicate the location where modifications are made to existing systems in accordance with an embodiment of the present invention. In particular, modifications as described below, are preferably made to the link layers 24 and 27 in the mobile station 7 and the base station 3, respectively. No other changes to existing hardware and/or software are required.

FIG. 3A is a block diagram depicting components that can be used to implement an embodiment of the present invention in the mobile station 7. A portion of a protocol stack in the mobile station 7 is represented in FIG. 3A. In particular, the protocol stack comprises a network layer 40, a link layer 41, and a physical layer 42. In a preferred embodiment, the present invention is implemented by adding components to the link layer 41. Accordingly, as shown, no changes are required in any of the other layers in the protocol stack.

At least two service protocols are used to implement this example embodiment of the present invention. In particular, as shown, the present invention utilizes a link access protocol (LAP) 48 and a forward error correction (FEC) protocol 49. More generally however, the present invention utilizes at least one basic error-detecting/correcting protocol (such as LAP 48), and at least one robust error-detecting/correcting protocol (such as FEC 49) to achieve the performance improvements of TCP/IP as described herein.

In other embodiments, more than two service protocols are used. However, it is important to note that unlike current systems, which use a single service protocol, the present invention makes use of at least two different selectable service protocols. As described below, a particular service protocol is selected based on a predefined criteria associated with the wireless channel quality.

Before describing the details of this example embodiment of the present invention, it is important to note the general distinctions between basic error-detecting/correcting protocols and robust error-detecting/correcting protocols. In general, basic error-detecting/correcting protocols, such as LAP 48, add a small amount of redundant information to each data frame. This small amount of redundant information is used by the receiving system to detect the occurrence of errors. When errors are detected, the sending system is asked to re-transmit one or more data frame(s) associated with the error(s).

Robust error-detecting/correcting protocols, on the other hand, include a larger amount of redundant information with each data frame. This redundant information is sufficiently large to correct the data when errors that are detected. Accordingly, re-transmitting data frames are generally not required when robust error-detecting/correcting protocols, such as FEC 49, are used.

The benefit to using basic error-detecting/correcting protocols, such as LAP 48, rather than robust error-detecting/correcting protocols, such as FEC 49, is that the former requires less redundant information, thereby increasing the data payload carried on a channel.

Robust error-detecting/correcting protocols, such as FEC 49, are generally used for mission critical data that must be received on the first transmission. For example, robust error-detecting/correcting protocols are used to transmit telemetry data from spacecraft to mission control centers. In this environment, the re-sending of data is either impracticable or impossible. Robust error-detecting/correcting protocols are also used in noisy environments and when large bandwidth channels are available.

Current link layer implementations of communication protocol stacks using TCP/IP generally use a LAP error-detecting service protocol. LAP is a common full duplex, point-to-point bit synchronous data link control protocol. The application program 30 presents a data stream for transmission to TCP/IP 22. TCP/IP 22 will split this data into packets. These packets are modified by the addition of headers containing packet identification information. These packets are passed to the network layer 23, where the packet headers may be compressed, and the packet encrypted. The packet is passed the link layer 24, where it is divided into frames. How these frames are further modified depends on the type of link protocol used. If a basic error-detecting/correcting protocol is used (e.g. LAP) the frames are modified by the addition of headers containing frame identification information. If a robust error-detecting/correcting protocol is used (e.g. FEC), headers containing frame information are added and correction bits are inserted into the frame. Examples of such coding schemes are Hamming Code and Convolutional Code.

As stated, the link layer embodiment of the present invention comprises at least one selectable basic error-detecting/correcting protocol and at least one selectable robust error-detecting/correcting protocol. In this example, the robust error-detecting/correcting protocol is represented by the FEC module 49, and the basic error-detecting/correcting protocol is represented by the LAP module 48.

In operation, the present invention defaults to the LAP basic error-detecting/correcting protocol 48. Accordingly, the LAP module 48 is used during normal operating conditions when the channel quality is above a predetermined threshold. However, when the channel quality (or predicted channel quality) falls below a predetermined level, the present invention attempts to switch to the FEC module 49 to implement the forward error-correcting service protocol.

As described below, the switch to another service protocol can be achieved if the currently communicating base station 3 supports the "changeover feature," also referred to as the "switchable L2 feature," in accordance with the principles disclosed herein. Otherwise, the LAP protocol is maintained and operations continue using the LAP module 48. In this case, the performance improvements of the present invention will not be realized, but this feature makes the present invention compatible with conventional systems.

Referring back to FIG. 3A, the FEC module is coupled with a downstream switch 47 and an upstream switch 38. Similarly, the LAP module 48 is coupled with the downstream switch 47 and the upstream switch 38. The upstream and downstream switches 38 and 47 function to enable either the LAP module 48 or the FEC module 49 and control the data flow through the appropriate protocol module.

Thus, when the LAP module 48 is enabled, the data path indicated by the arrows 56 is active. Similarly, when the FEC module 49 is enabled, the data path indicated by the arrows 54 is active. The upstream and downstream switches 49 and 47 operate in concert to control the data flow. As shown, a protocol selection module 44 is coupled to the upstream and downstream switches 49 and 47. The protocol selector 44 controls when the switches 38 and 47 are activated to switch protocols.

The protocol selector 44 is coupled with a quality of service (QOS) module 43. The QOS module 43 is coupled with a quality of service indicator 46, which is generally coupled to the physical layer 42. As the name implies, the quality of service indicator 46 is used to indicate a quality of service. The quality of service indicator can be of many forms as long as it indicates either a current or a predicted quality of service.

For example, the quality indicator 46 can be as simple as a data logger found in many cellular telephone transceivers. Generally, a data logger keeps track of bit error rates (BER) for data transmissions and is used as a debugging tool by service technicians.

In this example, the data logger 46, or more generally, the quality indicator 46, is used to track the bit error rate of data transmissions. This is monitored on a continual basis by the QOS module 43. When the QOS module determines that the quality indicator is below a certain predefined threshold, it alerts the protocol selection module 44 to attempt to switch protocols.

As stated, many other means can be used as the quality indicator 46. Using the above example of the bit error rates, the quality indicator reports a historical and current signal quality. In a preferred embodiment of the present invention, a predicted or future indication of signal quality is preferred. A future indication of signal quality is preferred to allow for additional time to correct errors during rapidly fading conditions.

For example, to predict a signal quality, signal channel quality estimates are derived from a measurement of the received signal power, retrieved from the physical layer 25. This could for example, predict a fading signal quality before it occurs.

In one example embodiment, three separate channel quality estimation methods are used as follows:

1) Test T1: Signal-to-Noise-and-Interference-Ratio (SINR). Test T1 is used when a packet is not in error.
2) Test T2: Packet Error test (PER). Test T2 is used when a packet is in error.
3) Test T3: Average Signal strength (SNR). Test T3 is used for all packets.

In this fashion, by including all three methods T1, T2, T3, a large variety of channel failure mechanisms and impairment levels may be covered. For example, low levels of interference will degrade packet communications, whereas higher levels can completely obliterate them. By being responsive to gradual channel degradation (as one would largely be with estimation based on 'error-free' received packets T1), countermeasures can be taken before the overall communication quality becomes 'notably bad'. In addition, by immediately detecting, with low false alarm probability, sudden catastrophic interference events, countermeasures T2 can be taken to significantly diminish the impact of catastrophic events, so that they are barely perceived by the application 30. Interference may not be the culprit for a significant number of packet errors: a diminishing average signal level may be. The average signal strength test T3 makes this determination.

When many packet errors occur, the SINR test T1 would be seldom functional, because it only operates on error-free packets. For the large PER case, one solution would be to cross-check the average PER statistic against the average signal level statistic. If the measured FER is much larger than a projected FER based on the average signal level (say, using a plot of PER vs. SNR for a Rayleigh fading channel), then interference is probably present.

When the PER is large, adding extra error correction capability won't be of assistance, so the "average-PER vs. average-signal-level test" is oriented more towards determining whether a channel switch, base station reassignment, or exponential channel back-off should be performed. Therefore only details for the SINR test T1 are provided.

The SINR test T1 forms an SINR estimate by subtracting an estimate of the interference and noise power (in dB) from the measured signal power. The SINR is then be mapped to BER and/or PER using previously tabulated BER (or PER) vs. SNR characteristics (for the communication method and channel). This test is used determine whether the channel impairment is due to low signal levels (caused by Rayleigh fading or building shadowing, or propagation loss, for example) or interference (caused by channel congestion for example). This determination is required to allow the correct recovery action (e.g. protocol switch or congestion avoidance) to take place. The SINR statistic in itself is sufficient to determine what grade of service could be supported with a particular error correction strategy. If the SINR, (or projected PER or BER, or average SINR) drops below an allowable threshold, then a request can be made for increased error correction capability (i.e. FEC), a better channel, or a handover to a different base station.

Example: T1 Test SINR: SINR, PER, and BER Estimation for Packets Not in Error

Measurements

1. Signal+Noise+Interference Estimate: RSSI (Relative Signal Strength Indication) measurement. Available from the physical layer 25, either from the RF circuitry or the demodulator circuitry
2. Noise+Interference Power Estimate: Average of the squared detection residuals (received symbol-detected symbol) for each received symbol in a packet.

This averaged statistic (mean-squared detection error) is generally compiled by the physical layer 25, and is accessible by the higher layers.

Calculations

SINR_in_dB=RSSI_in_dB−(estimated noise+interference power) in dB

Justification for the above statistic $$(S+N+I)/(N+I)=S/(N+I)+I+RSSI \rightarrow /(\text{estimated noise+interference power})=1+SINR$$

SINR=RSSI/(estimated noise+interference power)−1

Typically, if the data is received without error, SINR>>1, which implies

SINR≈RSSI/(estimated noise+interference power), or, equivalently,

SINR_dB=RSSI_in_dB−(estimated noise+interference power)_in_dB

Significance of SINR in dB

When the SINR_in_dB begins to get small, the channel quality will become questionable for the current level of error protection, and Forward Error Correction should be requested.

Conversion to BER

A lookup table maps SINR_in_dB to expected BER, using a standard BER vs. SINR characteristic curve as its reference. Consulting this table allows a prediction of what the operating BER is, even when no bits are in error. BER vs. SINR curves are standard performance data calculated by Systems Engineers during the design process, and recorded by Field and Production Engineers for production parts. The mapping process is valid because that over a single packet, the signal level is relatively constant—even in a wireless environment—although it may not be constant from packet to packet.

Wireless communication standards such as PHS (Japan), DECT (Europe), and IS-95 (U.S.) share this characteristic.

This allows the use of BER vs. S[I]NR characteristics based on AWGN (additive white gaussian noise) rather than Rayleigh fading. This is advantageous because it leads to much higher levels of statistical significance with lesser numbers of packets. Rayleigh fading characteristics are averaged over an ensemble of fading power to form an average performance. This implies that many packets (and signal levels) must be spanned for them to have significance. (Without statistical significance, one cannot take any actions based on the data with a large degree of certainty that the data has been interpreted correctly).

Conversion to Packet error Rate PER

The SINR_dB can also be mapped directly into the packet error rate (PER) using PER vs. SINR statistics. This mapping can be done with a lookup table, similar to the BER conversion described above (if the channel SINR is constant over a frame interval of time).

Another conversion (which utilizes the BER estimate) is

PER=1−(1−BER)^numsymbols_in_burst

Note that these calculations allow one to predict the frame/packet error rate accurately, despite the fact that statistics are taken only on frames not in error. This method has a much higher resolution than counting the number of packet errors, because it takes a large number of packets to get statistically sufficient numbers for the packet error rate.

Rationale for use only with packets not in error

The squared detection residuals used to form this estimate are not an accurate measure of the noise+interference power when there are bit errors in the frame. The bit errors bias the residuals. Residuals should only contain noise and interference contributions if they are to be used to estimate power levels of those sources.

Modifications to account for measurement errors etc.

Various uncertainties will arise in the measurement process. Sources of such uncertainties include manufacturing non-uniformity [primarily in RF parts], temperature of operation, tracking errors, or RSSI measurement accuracy. In a practical implementation, a mechanism must be invoked to desensitize the method to such uncertainties; otherwise, erroneous SINR and PER estimates, along with subsequent false alarms could result. For this reason, in practical applications, one preferably does not directly map the SINR_in_dB to a PER or BER figure. Instead, an adjustment for 'worst-case measurement errors' is made, and the resulting statistic is used during the FER or BER mapping. This statistic is calculated using the formula:

worst_case_SNR_in_dB=SINR_in_dB+error_margin_in_dB where error margin_in_dB can be set to several dB, and yet detect degraded channels/interference quite well. However, the more the margin, the less sensitive the algorithm is in detecting channel impairments and interference.

An alternative approach to directly computing the SINR (which achieves similar aims) is to track the interference level. FIGS. 8A–8D are example algorithms (in pseudocode) that can be used for Signal Quality Statistic-based Interference Tracking. The use of this pseudocode to implement these algorithms would be apparent to persons skilled in the relevant art(s). In this example, Signal Quality is defined as the sum of detection residuals. Signal Quality vector is defined as the Signal Quality evaluated at a number of different SNRs, stored one entry in the vector per SNR value.

It is noted that other means, in addition to the example described above, can be used by the QOS monitor 43 to indicate a current or to predict a future signal quality. Accordingly, the examples used herein should not be construed to limit the scope and breadth of the present invention.

Referring back now to FIG. 3A, the protocol selection module 44 is coupled to an establish new protocol (ENP) module 45. The ENP module 45 determines if the current base station 3 supports the switchable L2 feature of the present invention. If the changeover feature is supported, the ENP 45 operates to establish a new protocol with the base station 3. Examples of procedures that can be used to determine if the base station 3 supports the changeover feature, are described below with reference to FIGS. 5 and 6.

Once a new protocol has been established with the base station 3, the ENP 45 sends a signal to the protocol selection module 44. In response to this signal, the protocol selection module 44 switches protocols by sending the appropriate signals to the upstream and downstream switches 38 and 47, simultaneously.

It should be noted that the organization and the description of the separate modules shown in FIG. 3A are for exemplary purposes only to distinctly point out and describe the features and functions of the present invention. Many other organizations or modules are possible, as would be appreciated by persons skilled in the relevant art(s). Accordingly, the use of the modules for describing the general functionality of the present invention should not be construed to be limiting.

Figure 3B:
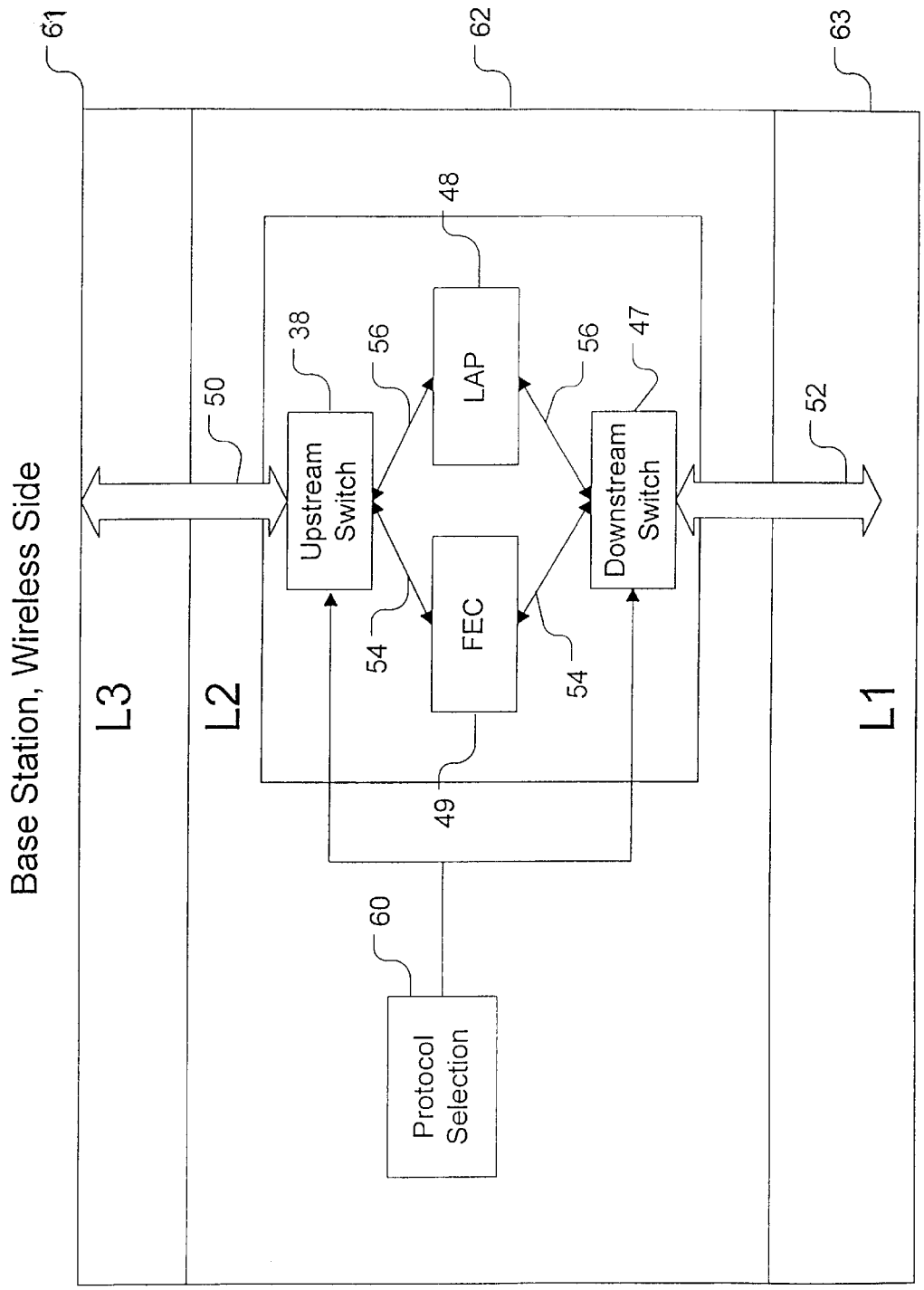
FIG. 3B is a block diagram depicting components of the present invention within a base station, according to an embodiment of the present invention.

FIG. 3B is a block diagram depicting components that can be used to implement an embodiment of the present invention in base station 3. A portion of a protocol stack in the base station 3 (wireless side 18) is represented in FIG. 3B. In particular, the protocol stack comprises the network layer 61, the link layer 62, and the physical layer 63. In a preferred embodiment, the present invention is implemented by adding components to the link layer 62 on the wireless side 18 of the base station 3. Accordingly, as shown, no changes are required in any of the other layers in the protocol stack.

As shown, the components that are added to link layer 62 of the base station 3 are the same components as described above with respect to the mobile station 7. However, in this example, not all of the components used in the mobile station 7 are used in the base station 3. In this example, the base station 7 lacks a QOS monitor, a quality indicator and an establish new protocol module. These modules are not included because the base station 3, in this example, does not monitor signal quality. Instead, in this example, the base station 3 only responds to a switchover message from the mobile station 7. As described below, when the base station 3 receives a switchover message it switches to the appropriate protocol (49 or 48).

However, in other embodiments, the base station 3 can monitor signal quality in much the same manner as described above with respect to the mobile station 7. In that case, the components that are missing from FIG. 3B are added, such that FIG. 3B looks similar or exactly the same as FIG. 3A. The choice of functionality implemented within the base and mobile stations, 3 and 7, depend on each specific implementation of the present invention.

In this example, however, the base station 3 receives a switchover message from the mobile station 7 to switch protocols. When this occurs, the protocol selection module 60 enables the protocol specified by the switchover message. All of the remaining components shown in FIG. 3B function the same as the associated components described above in FIG. 3A.

Figure 4:
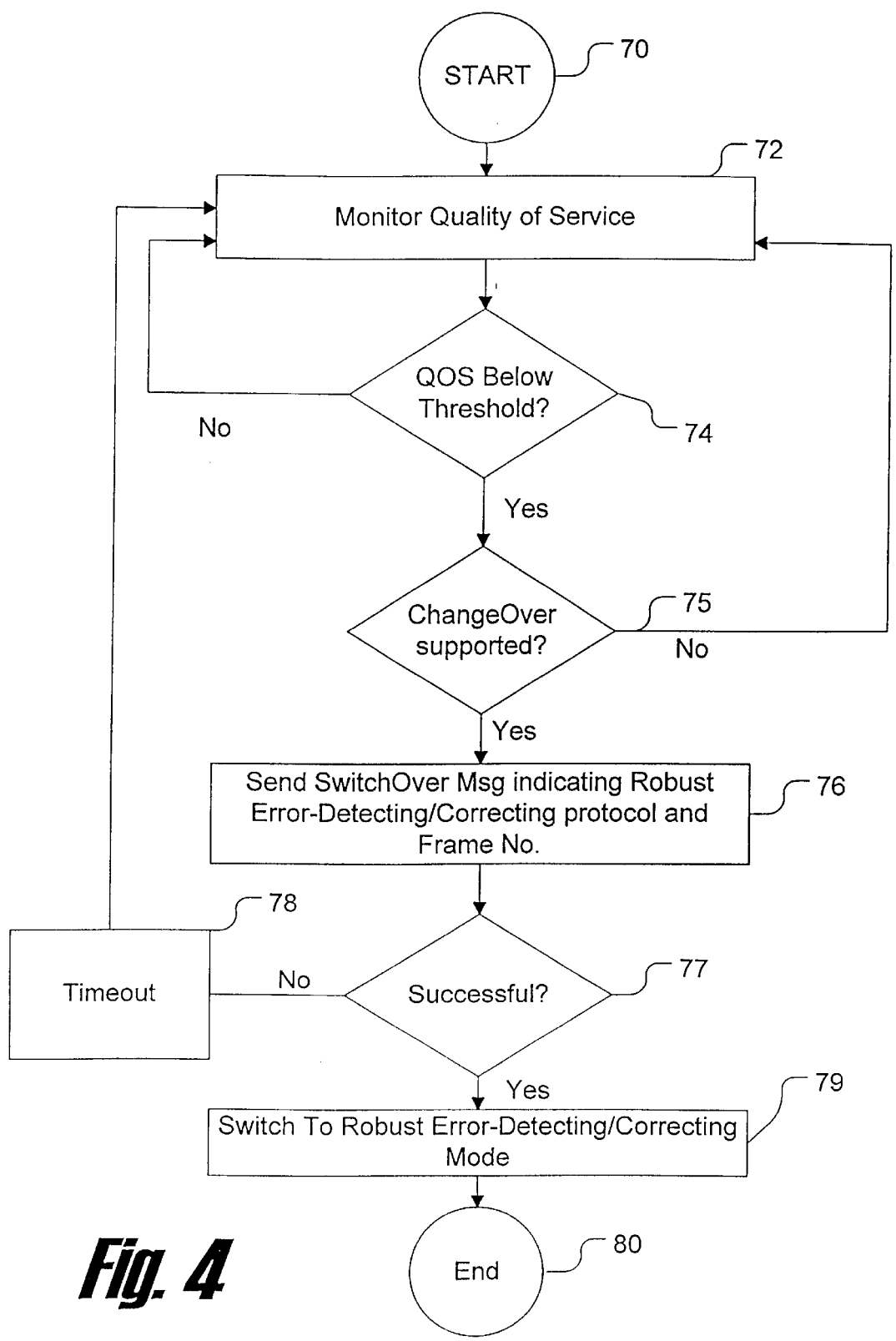
FIG. 4 is a flowchart depicting a process that can be used to implement an embodiment of the present invention.

FIG. 4 is a flowchart depicting a process that can be used to implement the present invention. In particular, it is assumed that the default basic error-detecting/correcting protocol (such as LAP 48) is active. Typically, communications are established between a base station 3 and a mobile station 7 using the default basic error-detecting/correcting protocol.

The process begins with step 72. In step 72, the process monitors the quality of service. As stated, this can be performed by monitoring a quality indicator 46, such as a bit error rate logger coupled to the physical layer. In another example, a quality of service indicator can be achieved by predicting future signal quality using the methods described above. Next, in step 74, the process determines whether the quality of services is below a predetermined threshold. If not, the process loops back to step 72, where the quality of service is monitored on a continual basis, as indicated by the loop 72-74. If the quality of service falls below the predetermined threshold, control passes to step 75.

In step 75, the process determines whether the changeover feature of the present invention is supported. If it is not, control passes back to step 72, as indicated. Methods that can be used to determine if the changeover feature of the present invention is supported are described below.

If it is determined that the changeover feature is supported, control passes to step 76. In step 76, the process sends a switchover message to the base station 3 to indicate that a protocol switch to the robust error-detecting/correcting protocol should occur at the next, (or a specified) frame number. Next, in step 77 the process determines if the protocol switch was successful.

Several methods can be used to determine if the protocol switch in the base station 3 is successful. For example, using an unacknowledged scheme, it is always assumed that the switchover message was received and that the switchover to the new protocol is successful. Thus, using this scheme, control passes directly to step 79 (in fact, step 77 can be omitted altogether). It is noted that if this assumption is incorrect, the mobile station 7 will be using a robust error-detecting/correcting protocol and the base station 3 will be using a basic error-detecting/correcting protocol. This will cause a protocol failure, which will force a link-reestablishment to occur between the mobile station and the base station. The link-reestablishment procedure will serve to return both the mobile station 7 and the base station 3 to the default basic error-detecting/correcting protocol.

If an acknowledged scheme is used, step 77 determines if an acknowledged message is received within a predetermined time interval. If an acknowledged message is received, control passes to step 79. If the message is not received within a predetermined time interval, control passes to step 78, where after a predetermined time-out period, control passes back to step 72, where the process monitors the quality of service again. This process can continue until either an acknowledged message is received, or the number of attempts have exceeded a predetermined threshold and the process returns with an error indication (not shown).

As indicated by step 79, upon a successful response from step 77, the process switches modes from the basic error-detecting/correcting protocol to the robust error-detecting/correcting protocol, as described above. Next, as indicated by step 80, the process ends.

Figure 5:
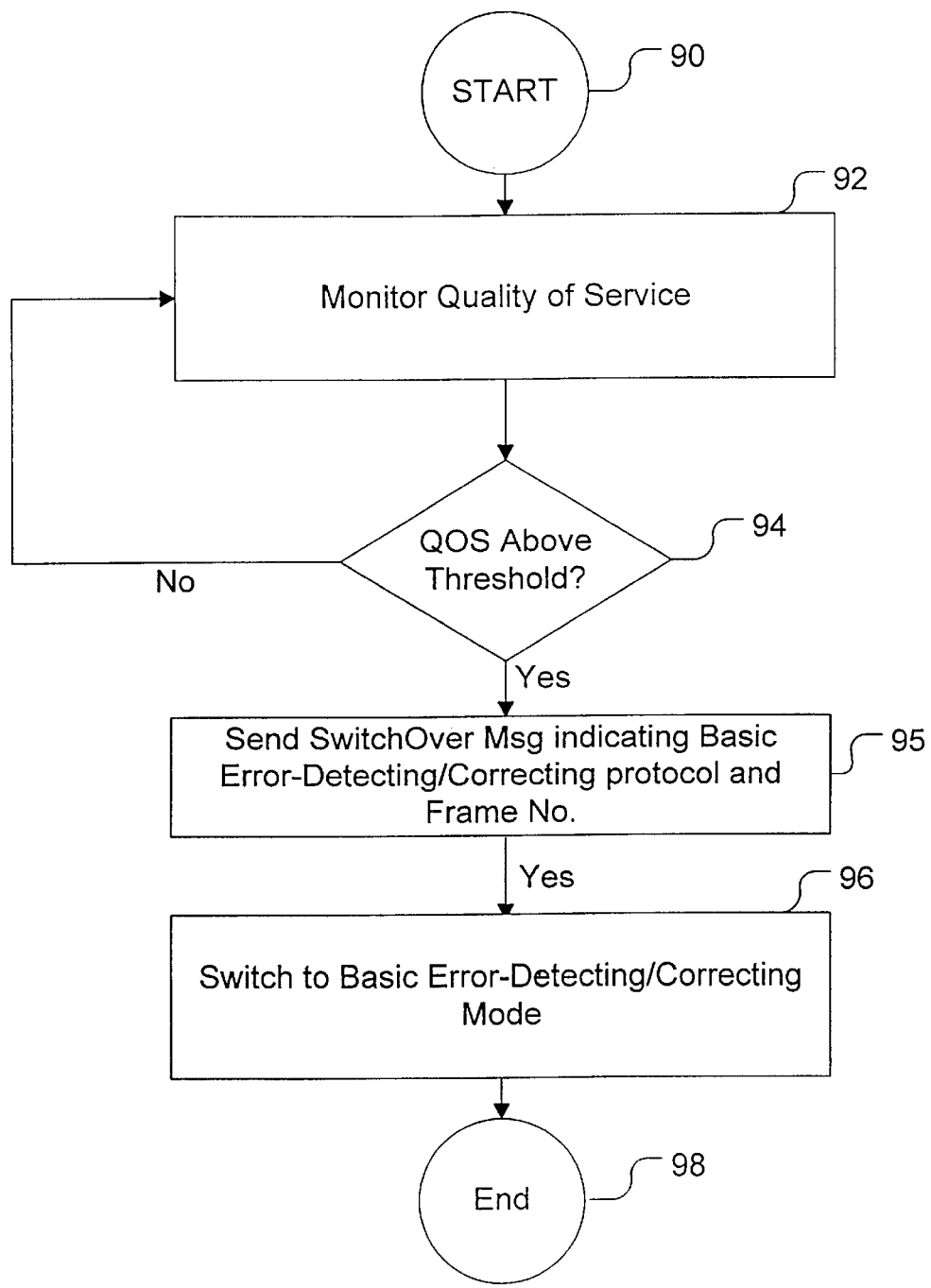
FIG. 5 is a flowchart depicting a process that can be used to switch back from an robust error-detecting/correcting protocol to an basic error-detecting/correcting protocol, according to the present invention.

FIG. 5 is a flowchart depicting a process that can be used to switch back from a robust error-detecting/correcting protocol to a basic error-detecting/correcting protocol. The process begins with step 92, where the quality of service indicator is monitored. Next, in step 94, the process determines if the quality of service has risen above a predetermined threshold value.

Note that in a preferred embodiment, the value used for the predetermined threshold from step 94 is not the same as the value used for the predetermined threshold from step 74. Instead, a somewhat lower error rate should be used to switch back to the basic error-detecting/correcting protocol to avoid excessive mode switches. For example, suppose a bit error rate of 10% is selected for the threshold value in step 74. In this case, a lower error-rate (i.e. 5%), should be used for the threshold value to switch back to the basic error-detecting/correcting protocol.

Next, as shown in step 95, the process sends a switchover message to the base station 3 to indicate that a protocol switch to the basic error-detecting/correcting protocol should occur at the next, (or a specified) frame number.

Next, as indicated by step 96, the switch back to the basic error-detecting/correcting protocol is performed. As shown, in this example, there is no need to determine whether the receiving base station supports the changeover feature of the present invention. This is so, because in this example, the system had already switched from the basic error-detecting/correcting to the robust error-detecting/correcting protocol. Therefore, because the process depicted in FIG. 5 had previously been executed, it is known that the current receiving system supports the changeover feature.

Figure 6:
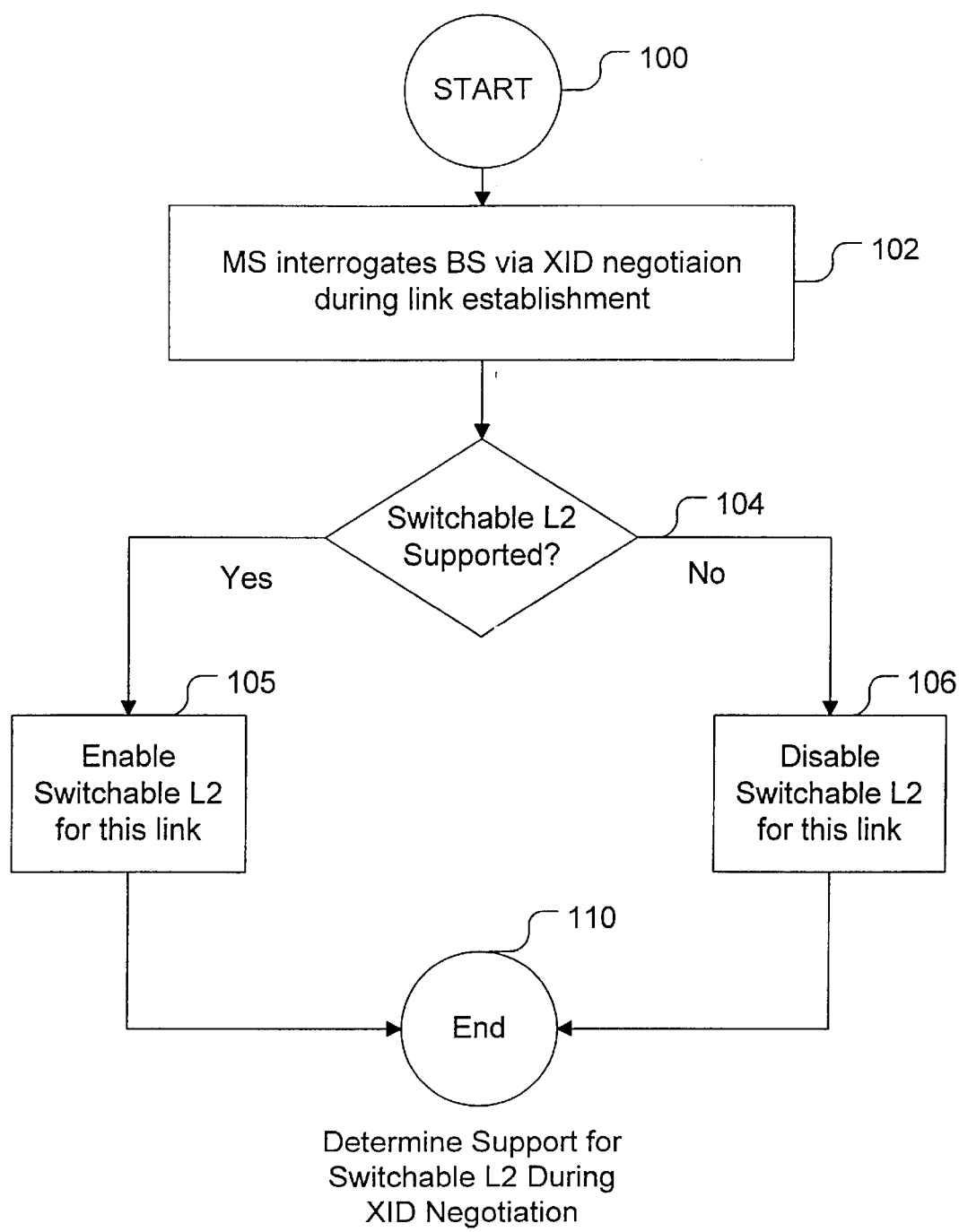
FIG. 6 is a flowchart depicting a process that can be used to determine if a base station supports the changeover protocol feature of the present invention during XID negotiation.

FIG. 6 is a flowchart depicting a process that can be used to determine if a base station 3 supports the changeover feature of the present invention. The process begins with step 102. In step 102, the mobile station 7 interrogates the base station 3 to determine whether such support is implemented. Preferably, this is accomplished with the use of a new predefined message designed for this purpose. The message is preferably sent during the XID negotiation phase during link establishment.

Next, as indicated by step 104, control passes to step 105, if the switchable L2 protocol feature is supported. In step 105, the process enables the feature for the current link. This can be accomplished for example, by simply setting a bit in a register, or more generally, setting a BOOLEAN flag. This flag is checked, for example during step 75 in FIG. 4, to determine if the current base station supports the changeover feature.

The opposite procedure is performed in step 106, if it is determined that the changeover feature is not supported. That is, the register bit is cleared in this case. Next, as indicated by step 110, the process ends.

Figure 7:
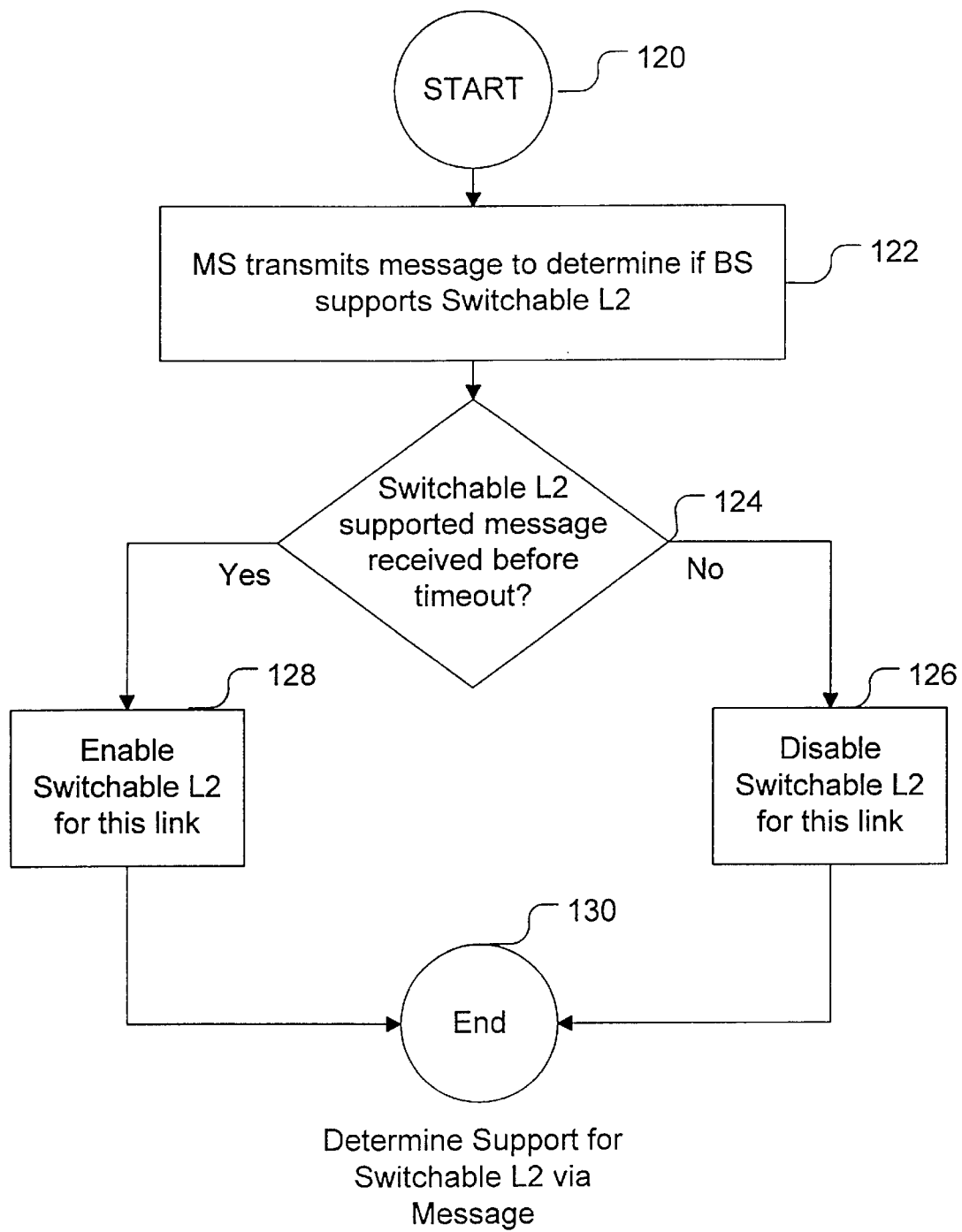
FIG. 7 is a flowchart depicting a process that can be used to determine if a base station supports the changeover protocol feature of the present invention via a message sent during data communications.

FIG. 7 is a flowchart depicting a process that can be used to determine if a base station 3 supports the switchable L2 protocol feature of the present invention. In this example, instead of making this determination during XID negotiation, it is made just before switching protocols (i.e. when a quality of service problem is detected).

The process begins with step 122. In step 122, the mobile station 7 sends a predetermined message to the base station 3 to determine if the changeover feature is supported. One method that can be used to accomplish this task is to use the Sync or Paging channel available on CDMA devices, for example.

Next, as indicated by step 124, the process waits for a predetermined time interval to receive a message back from the base station 3. If a message is not received within the predetermined time interval, or a message is received indicating no support for the feature, control passes to step 126. In step 126 the changeover feature is disabled. If a message is received that indicates support of the changeover feature, control passes to step 128, where the feature is enabled. Next, as indicated by step 130, the process ends.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for use by a mobile station to improve performance over wireless connections between a base station and the mobile station, said mobile station having at least two service protocols comprising a basic error-detecting/correcting protocol and a robust error-detecting/correction protocol different from the basic error-detecting/correcting protocol, said method comprising the steps of:

establishing a communication link with the base station using the basic error-detecting/correcting protocol over a transmission channel;

monitoring a signal quality of the transmission channel;

determining if the signal quality falls below a first predetermined threshold;

sending a switchover message to the base station to switch from the basic error-detecting/correcting protocol to the robust error-detecting/correcting protocol, if the signal quality falls below the first predetermined threshold; and switching to the robust error-detecting/correcting protocol.

2. The method of claim 1, further comprising the steps of:

sending a switchover message to the base station to switch from the robust error-detecting/correcting protocol to the basic error-detecting/correcting protocol, if the signal quality rises above a second predetermined threshold; and switching to the basic error-detecting/correcting protocol.

3. The method of claim 1, wherein the basic error-detecting/correcting protocol is a link access protocol.

4. The method of claim 1, wherein the robust error-detecting/correcting protocol is a forward error correcting protocol.

5. The method of claim 1, further comprising the steps of:

querying the base station to determine if the base station supports the at least two service protocols; and performing said sending and switching steps only if the base station supports the the at least two service protocols.

6. The method of claim 5, wherein said querying step is performed using XID negotiation during said establishing step.

7. The method of claim 5, wherein said querying step is performed by sending a message to the base station and then waiting for an acknowledgement from the base station to indicate support.

8. The method of claim 1, wherein said step of monitoring the signal quality is performed by monitoring a bit error rate of the communication link.

9. The method of claim 1, wherein said step of monitoring the signal quality is performed by predicting a future change in signal quality.

10. The method of claim 9, wherein said step of predicting a future change in signal quality is accomplished by applying an estimate of signal to noise and interference ratio (SINR).

11. The method of claim 10, wherein said step of applying an estimate of SINR includes subtracting said estimate of the interference and noise power from a measured signal power.

12. The method of claim 11, wherein said SINR is converted into a bit error rate.

13. The method of claim 1, further comprising the step of receiving a switchover acknowledgement from the base station in response to said sending step.

14. The method of claim 1, further comprising the step of querying the base station to determine if the base station supports the at least two service protocols, wherein said querying step occurs between said determining step and said sending step.

15. The method of claim 1, wherein said switchover message includes a parameter indicating the service protocol.

16. The method of claim 1, wherein said switchover message includes a parameter indicating a frame number.

17. The method of claim 16, wherein said switching step occur after a frame having the frame number.

18. A system for providing improved performance over wireless connection comprising:

a mobile station having a protocol stack with a link layer comprising:

at least two service protocols comprising at least one basic error-detecting/correcting protocol and at least one robust error-detecting/correction protocol different from the at least one basic error-detecting/correcting protocol;

a quality of service monitor for determining a signal quality of a transmission channel: and a protocol selector coupled to said at least one basic error-detecting/correcting protocol and said at least one robust error-detecting/correcting protocol and said quality of service monitor, for selecting among said at least one basic error-detecting/correcting protocol and said at least one robust error-detecting/correcting protocol in accordance with said quality of service monitor; and a base station having a protocol stack with a link layer comprising:

at least two service protocols comprising at least one basic error-detecting/correcting protocol and at least one robust error-detecting/correction protocol different from the at least one basic error-detecting/correcting protocol; and a protocol selector coupled to said at least one basic error-detecting/correcting protocol and said at least one robust error-detecting/correcting protocol and said quality of service monitor, for selecting among said at least one basic error-detecting/correcting protocol and said at least one robust error-detecting/correcting protocol in accordance with a switchover message from said mobile station.

19. The system of claim 18, wherein said protocol selector in said mobile station switches from the at least one basic error-detecting/correcting protocol to the at least one robust error-detecting/correcting protocol when said quality monitor indicates a degradation in said signal quality.

20. The system of claim 18, wherein said protocol selector in said mobile station switches from the at least one robust error-detecting/correcting protocol to the at least one basic error-detecting/correcting protocol when said quality monitor indicates an improvement in said signal quality.

21. The system of claim 18, wherein said quality of service monitor is coupled with a quality of service indicator coupled to the physical layer in the protocol stack.

22. The system of claim 21, wherein said quality of service indicator is a data logger that tracks a bit error rate of data communications.

23. The system of claim 21, wherein said quality of service indicator is a measure of a received signal power that is used for predicting a future signal quality.

24. The system of claim 23, wherein said received signal power is derived from relative signal strength indication measurement.

25. A mobile station configured to improve performance over wireless connections between a base station and the mobile station, the mobile station comprising:
   at least two service protocols comprising a first error-detecting/correcting protocol and a second error-detecting/correction protocol different from the first error-detecting/correcting protocol;
   a link establishment module for establishing a communication link with the base station using the first error-detecting/correcting protocol over a transmission channel;
   a quality of service monitor for determining a signal quality of the transmission channel;
   a transmitter for sending a switchover message to the base station to switch from the first error-detecting/correcting protocol to the second error-detecting/correcting protocol if the signal quality passes the first predetermined threshold; and
   a protocol selector for switching to the second error-detecting/correcting.

26. The mobile station of claim 25, wherein said transmitter sends a switchover message to the base station to switch from the second error-detecting/correcting protocol to the first error-detecting/correcting protocol if the signal quality passes a second predetermined threshold, and wherein the protocol selector switches to the first error-detecting/correcting protocol.

27. The mobile station of claim 25, wherein the first error-detecting/correcting protocol is a link access protocol.

28. The mobile station of claim 25, wherein the second error-detecting/correcting protocol is a forward error correcting protocol.

29. The mobile station of claim 25 further comprising a query module for querying the base station to determine if the base station supports the at least two service protocols, wherein the switchover message is transmitted only if the base station supports the at least two service protocols.

30. The mobile station of claim 29, wherein the query module is a part of the link establishment module and uses XID negotiation.

31. The mobile station of claim 29, wherein the query module sends a message to the base station and then waiting for an acknowledgement from the base station to indicate support.

32. The mobile station of claim 25, wherein the quality of service monitor monitors a bit error rate of the communication link.

33. The mobile station of claim 25, wherein the quality of service monitor predicts a future change in signal quality.

34. The mobile station of claim 33, wherein the quality of service monitor applies an estimate of signal to noise and interference ratio (SINR) to predict the future change in signal quality.

35. The mobile station of claim 34, wherein the quality of service monitor subtracts said estimate of the interference and noise power from a measured signal power.

36. The mobile station of claim 35, wherein said SINR is converted into a bit error rate.

37. The mobile station of claim 25 further comprising a receiver for receiving a switchover acknowledgement from the base station in response to the transmitter sending the switchover message.

38. The mobile station of claim 25 further comprising a query module for querying the base station to determine if the base station supports the at least two service protocols, wherein the query module queries after determining that the signal quality has fallen below the first predetermined threshold, but before sending the switchover message.

39. The mobile station of claim 25, wherein said switchover message includes a parameter indicating the service protocol.

40. The mobile station of claim 25, wherein said switchover message includes a parameter indicating a frame number.

41. The mobile station of claim 40, wherein said switching step occur after a frame having the frame number.

42. The mobile station of claim 25, wherein the first error-detecting/correcting protocol is less robust than the second error-detecting/correcting protocol, and wherein the transmitter sends the switchover message if the signal quality fails below the first predetermined threshold.

43. The mobile station of claim 25, wherein the first error-detecting/correcting protocol is more robust than the second error-detecting/correcting protocol, and wherein the transmitter sends the switchover message if the signal quality rises above the first predetermined threshold.

44. A method for use by a mobile station to improve performance over wireless connections between a base station and the mobile station, said mobile station having at least two service protocols comprising a first error-detecting/correcting protocol and a second error-detecting/correction protocol different from the first error-detecting/correcting protocol, said method comprising the steps of:
   establishing a communication link with the base station using the first error-detecting/correcting protocol over a transmission channel;
   monitoring a signal quality of the transmission channel;
   determining if the signal quality falls below a first predetermined threshold;
   sending a switchover message to the base station to switch from the first error-detecting/correcting protocol to the second error-detecting/correcting protocol if the signal quality passes the first predetermined threshold; and
   switching to the second error-detecting/correcting protocol.

45. The method of claim 44, further comprising the steps of:
   sending a switchover message to the base station to switch from the second error-detecting/correcting protocol to the first error-detecting/correcting protocol if the signal quality passes a second predetermined threshold; and
   switching to the first error-detecting/correcting protocol.

46. The method of claim 44, wherein the first error-detecting/correcting protocol is a link access protocol.

47. The method of claim 44, wherein the second error-detecting/correcting protocol is a forward error correcting protocol.

48. The method of claim 44, further comprising the steps of:
   querying the base station to determine if the base station supports the at least two service protocols; and
   performing said sending and switching steps only if the base station supports the the at least two service protocols.

49. The method of claim 48, wherein said querying step is performed using XID negotiation during said establishing step.

50. The method of claim 48, wherein said querying step is performed by sending a message to the base station and then waiting for an acknowledgement from the base station to indicate support.

51. The method of claim 44, wherein said step of monitoring the signal quality is performed by monitoring a bit error rate of the communication link.

52. The method of claim 44, wherein said step of monitoring the signal quality is performed by predicting a future change in signal quality.

53. The method of claim 52, wherein said step of predicting a future change in signal quality is accomplished by applying an estimate of signal to noise and interference ratio (SINR).

54. The method of claim 53, wherein said step of applying an estimate of SINR includes subtracting said estimate of the interference and noise power from a measured signal power.

55. The method of claim 54, wherein said SINR is converted into a bit error rate.

56. The method of claim 44, further comprising the step of receiving a switchover acknowledgement from the base station in response to said sending step.

57. The method of claim 44, further comprising the step of querying the base station to determine if the base station supports the at least two service protocols, wherein said querying step occurs between said determining step and said sending step.

58. The method of claim 44, wherein said switchover message includes a parameter indicating the service protocol.

59. The method of claim 44, wherein said switchover message includes a parameter indicating a frame number.

60. The method of claim 59, wherein said switching step occur after a frame having the frame number.

61. The method of claim 44, wherein the first error-detecting/correcting protocol is less robust than the second error-detecting/correcting protocol, and wherein said sending step sends the switchover message if the signal quality falls below the first predetermined threshold.

62. The method of claim 44, wherein the first error-detecting/correcting protocol is more robust than the second error-detecting/correcting protocol, and wherein said sending step sends the switchover message if the signal quality rises above the first predetermined threshold.

63. A base station configured to improve performance over wireless connections between the base station and a mobile station, the base station comprising:

at least two service protocols comprising a first error-detecting/correcting protocol and a second error-detecting/correcting protocol different from the first error-detecting/correcting protocol;

a link establishment module fur establishing a communication link with the mobile station using the first error-detecting/correcting protocol over a transmission channel;

a quality of service monitor for determining a signal quality of the transmission channel;

a transmitter for sending a switchover message to the mobile station to switch from the first error-detecting/correcting protocol to the second error-detecting/correcting protocol if the signal quality passes the first predetermined threshold; and a protocol selector for switching to the second error-detecting/correcting.

64. The base station of claim 63, wherein said transmitter sends a switchover message to the mobile station to switch from the second error-detecting/correcting protocol to the first error-detecting/correcting protocol if the signal quality passes a second predetermined threshold, and wherein the protocol selector switches to the first error-detecting/correcting protocol.

65. The base station of claim 63 further comprising a query module for querying the mobile station to determine if the mobile station supports the at least two service protocols, wherein the switchover message is transmitted only if the mobile station supports the at least two service protocols.

66. The base station of claim 63, wherein said switchover message includes a parameter indicating the service protocol.

67. The base station of claim 63, wherein said switchover message includes a parameter indicating a frame number.

68. The base station of claim 67, wherein said switching step occur after a frame having the frame number.

69. The base station of claim 63, wherein the first error-detecting/correcting protocol is less robust than the second error-detecting/correcting protocol, and wherein the transmitter sends the switchover message if the signal quality falls below the first predetermined threshold.

70. The base station of claim 63, wherein the first error-detecting/correcting protocol is more robust than the second error-detecting/correcting protocol, and wherein the transmitter sends the switchover message if the signal quality rises above the first predetermined threshold.

* * * * *